UNITED STATES PATENT OFFICE.

RALPH WALDO EMERSON MacIVOR AND WOLDEMAR HOMMEL, OF LONDON, ENGLAND, ASSIGNORS TO THE METALS EXTRACTION CORPORATION LIMITED, OF LONDON, ENGLAND.

MANUFACTURE OF OXID OF ZINC FOR SMELTING.

1,007,124.  Specification of Letters Patent.  Patented Oct. 31, 1911.

No Drawing.   Application filed August 22, 1910. Serial No. 578,476.

*To all whom it may concern:*

Be it known that we, RALPH WALDO EMERSON MACIVOR, a citizen of the Swiss Republic, residing in London, England, and WOLDEMAR HOMMEL, a subject of the King of England, residing in London, England, have invented certain new and useful Improvements in the Manufacture of Oxid of Zinc for Smelting, of which the following is a specification.

This invention relates to improvements in the manufacture of oxid of zinc for smelting.

The oxid of zinc obtained by precipitation from solutions of zinc salts, or by the combustion of zinc vapor is generally light and bulky and for this reason practical zinc distillers object to the product as it is difficult to smelt.

The object of this invention is to overcome this difficulty by producing dense zinc oxid more suitable for smelting.

The process of densifying light zinc oxid according to this invention consists in mixing it with a strong solution of zinc chlorid so as to form an oxy-chlorid which sets and thereafter expelling zinc chlorid therefrom by heat, thus leaving zinc oxid of increased specific gravity.

A cyclic process for densifying light zinc oxid according to this invention consists in mixing light zinc oxid with zinc chlorid solution so as to form a dense oxy-chlorid expelling zinc chlorid therefrom by heat and collecting the zinc chlorid for re-use.

A modification of the process consists in mixing light zinc oxid with zinc chlorid solution and carbonaceous material such as coal to form a dense solid mass, heating the mass to drive off zinc chlorid without decomposing the carbonaceous matter, thus leaving a homogeneous mixture of zinc oxid and carbonaceous matter well suited for smelting by heat or electricity. This process results in a material which can readily be formed into electrodes for use in an electric zinc-smelting furnace.

According to the process above described, dense zinc oxid may be obtained from strong chlorid of zinc liquors which are obtained in a number of wet zinc processes. The method in this case consists in precipitating completely the oxid of zinc from part of the liquor by lime or other re-agent, mixing the precipitate with the remaining zinc chlorid to form a dense oxychlorid and expelling zinc chlorid therefrom by heat. In expelling the zinc chlorid from the zinc oxychlorid the action of heat may be assisted by conducting the reaction in a partial vacuum.

The following is one method according to this invention for preparing dense zinc oxid from light and bulky zinc oxid. The light zinc oxid is mixed with a strong solution of zinc chlorid the proportions being such as to yield an oxychlorid having approximately the formula $ZnCl_2.6ZnO$. This compound has the property of setting like cement into a dense solid. The compound is then exposed to a temperature slightly exceeding that at which zinc chlorid volatilizes (say about 300° C. to 400° C.), when the zinc chlorid passes off and is collected in a suitable condenser, while the dense oxid of zinc left behind may be readily mixed with carbonaceous matter and smelted. The zinc chlorid recovered from this operation is used repeatedly for densifying further quantities of light oxid. The volatilization of the zinc chlorid may be facilitated by conducting the operation *in vacuo*.

A preferred method of working in practice is, to add to the mixture of zinc oxid and chlorid, before the process of hardening sets in, a proportion of carbonaceous matter such as anthracite, coke, or bituminous coal sufficient to effect the reduction of the zinc oxid in the subsequent smelting of the same either by the ordinary distillation process or by electricity. The advantage of thus mixing the carbonaceous matter with the oxy-chlorid in the course of its formation consists in obtaining a product which owing to its porosity easily gives off the zinc chlorid on heating. The porosity of the final product after volatilization of the zinc chlorid also materially aids the subsequent smelting operation. If the carbonaceous matter employed is bituminous in nature it will be found that through the evolution of hydrocarbons and the decomposition thereof during the heating the whole mass of oxid of zinc and carbon will be homogeneous.

The original mixture of zinc oxychlorid and carbonaceous matter may advantageously be molded into blocks, and after the expulsion of the zinc chlorid in the manner described these blocks may be put into the smelting furnace or, if electric smelting is used, the mixture may be molded into plates, rods or any other convenient form so that after removal of the zinc chlorid these may be used as electrodes in the zinc-smelting furnace.

The process above described may be applied to the production of dense zinc oxid from strong zinc chlorid liquors as follows:—In treating a certain quantity of strong zinc chlorid liquor, $\frac{2}{7}$ of liquor is treated with lime or the like to precipitate oxid of zinc therefrom. This precipitate is then mixed with the remaining $\frac{5}{7}$ of zinc chlorid solution and these together will yield the oxy-chlorid, and subsequently the dense zinc oxid. The density of the zinc oxid obtained as above described is much greater than that of the light zinc oxid, in some cases twice as great.

What we claim as our invention and desire to secure by Letters Patent is:—

1. Densifying light zinc oxid by converting it into oxy-chlorid which sets, and expelling zinc chlorid therefrom by heat, thus leading zinc oxid of increased specific gravity.

2. A cyclic process for densifying light zinc oxid which consists in mixing light zinc oxid with zink chlorid solution so as to form a dense oxy-chlorid, expelling zinc chlorid therefrom by heat and collecting the zinc chlorid for re-use.

3. A process of densifying light zinc oxid which consists in mixing light zinc oxid with zinc chlorid solution and carbonaceous material such as coal to form a dense solid mass, heating the mass to drive off zinc chlorid without decomposing the carbonaceous matter, thus leaving a homogeneous mixture of zinc oxid and carbonaceous matter well suited for smelting by heat or electricity.

4. The process of densifying light zinc oxid, which consists in mixing light zinc oxid with zinc chlorid solution so as to form dense oxychlorid expelling zinc chlorid therefrom by the action of a reduced pressure and collecting the zinc chlorid for re-use.

In testimony whereof we have signed our names to this specification in the presence of two subscribing witnesses.

RALPH WALDO EMERSON MacIVOR.
WOLDEMAR HOMMEL.

Witnesses:
  H. D. JAMESON,
  CLAUDE McKENZIE.